Figure 1:
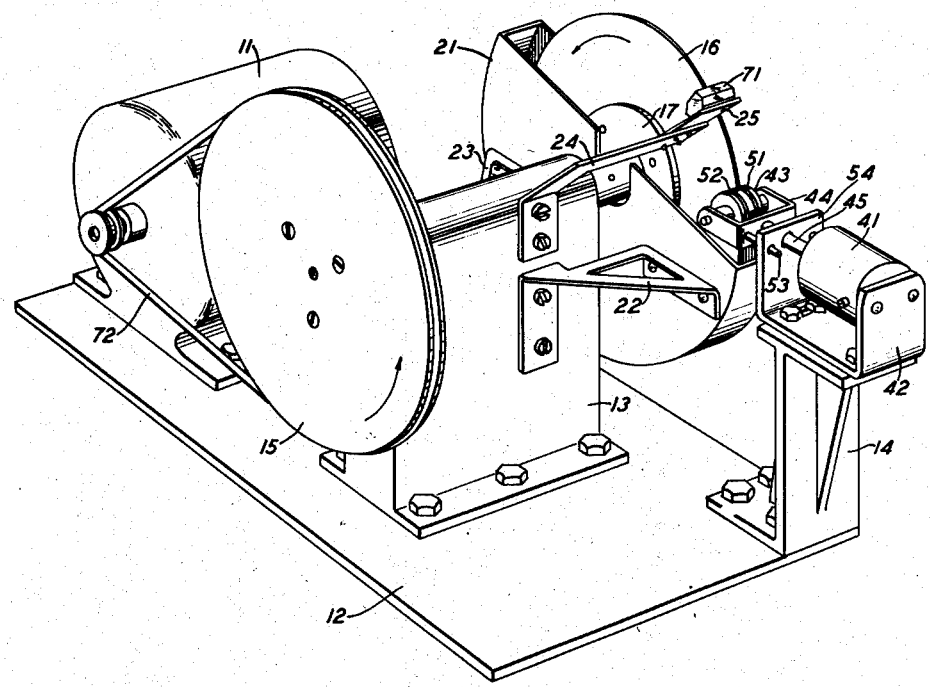

Aug. 18, 1942.   W. L. BOND   2,293,238
CUTTING TOOL
Filed Feb. 2, 1940

INVENTOR
W. L. BOND
BY
E.V. Griggs
ATTORNEY

Patented Aug. 18, 1942

2,293,238

UNITED STATES PATENT OFFICE 2,293,238

CUTTING TOOL

Walter L. Bond, South Orange, N. J., assignor to Bell Telephone Laboratories, Incorporated, New York, N. Y., a corporation of New York Application February 2, 1940, Serial No. 316,946

2 Claims. (Cl. 125—13)

This invention relates to a cutting tool and more particularly to a saw for cutting Rochelle salt and similar brittle, water soluble, materials.

An object of the invention is to facilitate cutting Rochelle salt and similar materials.

A more specific object of the invention is to prevent the accumulation on the edge of the blade of particles of the material being cut.

In the preparation of Rochelle salt plates, which have been utilized for some time as piezoelectric elements in electrical circuits such as oscillators and filters and which have more recently been proposed for use in electrical relays, as disclosed, for example, in Patent 2,166,763, issued July 18, 1939, to W. P. Mason, it is the usual practice to cut a number of relatively thin, substantially flat, plates or slabs from a larger crystal.

Various methods and means have been proposed in the past for cutting these thin plates including the "wet-string" cutter, the "mud saw" and saws utilizing toothed blades; none of these has, however, in applicant's experience, been entirely satisfactory. In some instances the operation has been entirely too slow to be commercially feasible, in others it has been practically impossible to produce plates of the desired thinness and with the necessary high degree of plane parallelism, while in still other instances excessive breakage of the fragile material has resulted.

In the case of the so-called mud saw, which commonly comprises a thin disc of steel or copper rotating in a liquid, such as water, containing abrasive, it is applicant's belief that unsatisfactory cutting of Rochelle salt and similar materials has resulted mainly from the fact that a salty accumulation tends to become glazed on the cutting edge of the disc thereby slowing down the cutting process to an unsatisfactory rate. Breakage of the fragile material also has resulted due to cooling of the material caused by evaporation of the liquid.

A feature of the present invention is means whereby the salty accumulation which tends to become glazed on the cutting edge of the blade is broken away.

A further feature of the invention is an abrasive carrying liquid which does not tend to cause cooling of the material being cut due to evaporation.

A still further feature of the invention is means for stabilizing the disc whereby lateral displacement during cutting is prevented.

In accordance with a specific embodiment of the invention, a metal disc, for example, of steel or copper, is provided which is rotated comparatively slowly, for example, at a speed of 150 revolutions per minute, in an abrasive liquid which comprises abrasive particles carried in kerosene. Means are provided for supporting the material to be cut in contact with the cutting edge of the disc. A metal roller, for example of hard steel, is rotatably supported in contact with the edge of the disc. Contact of the cutting edge of the disc with the roller is effective to break away any accumulation which tends to become glazed on the cutting edge of the disc. While the disc, of course, does tend to cut into the roller, this cutting is very slow due both to the hardness of the roller and to the fact that it is rotatably supported with respect to the disc whereby a new point of contact is constantly presented. The roller is preferably provided with a groove in which the edge of the disc rides; the walls of the groove, which is just slightly wider than the disc, are effective to prevent any lateral displacement of the disc during cutting.

Figure 2:
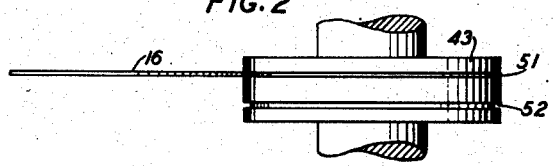

A thorough understanding of the arrangement contemplated by the present invention as well as appreciation of the various desirable features thereof may be gained from consideration of the following detailed description and the accompanying drawing in which:

Fig. 1 is a view in perspective of a cutting tool which embodies features in accordance with the present invention; and Fig. 2 is a plan view of a portion of the tool showing particularly the position of the roller with respect to the cutting edge of the disc.

Referring now to Fig. 1, driving motor 11 is shown mounted on platform 12. Also mounted on platform 12 are upright supporting members 13 and 14. Pulley-wheel 15 is attached to one end of a shaft (not shown) which is rotatably positioned in a transverse housing provided in the upper portion of support 13; cutting disc 16 is attached to the other end of the shaft. Disc 16 is of relatively thin metal, for example it may be of No. 16 to No. 20 gauge steel or copper, and is preferably provided with two reinforcing flanges; one of these flanges 17, being shown and the second, which is similar to flange 17 and mounted on the opposite face of disc 16, not being shown.

A tank 21 is supported from upright member 13 by bracket members 22 and 23; this tank serves as a container for the abrasive liquid, preferably kerosene carrying abrasive particles.

Also supported from upright member 13, by means of a third bracket member 24, is table 25 which serves as a support for the material being cut.

Dash-pot 41 is mounted on upright member 14 by means of bracket member 42. A hard steel roller 43 is rotatably supported by bracket 44 which is attached to the end of piston rod 45 of the dash-pot.

As shown more clearly in Fig. 2, roller 43 is provided with two circumferential grooves 51 and 52, the roller being shown in the position wherein the cutting edge of disc 16 is positioned in groove 51. In order to bring about engagement of the edge of disc 16 and groove 52, it is merely necessary, first, to remove tank 21 by removal of the bolts utilized in attaching brackets 22 and 23 to member 13, and then to remove disc 16 from the shaft, pull bracket 44 and piston rod 45 forward a sufficient distance to permit disengagement of positioning pin 53 from the aperture provided near the left edge of upturned portion 54 of bracket 42 and rotate piston rod 45 and bracket 44 one-half turn whereupon pin 53 may be engaged with a suitable aperture (not shown) provided near the right edge of upturned portion 54 of bracket 42. Disc 16 may now be replaced on the shaft, roller 43 now being in position wherein the edge of disc 16 will be positioned in groove 52.

In order to further describe the arrangement, let us assume that a slab is to be sawed from Rochelle salt crystal 71 which is shown in position on table 25. Pulley-wheel 15 and the driving-wheel of motor 11 are coupled by a suitable belt 72 so that, as motor 11 is set into operation, pulley-wheel 15 is rotated in the direction indicated by the arrow. This motion is, of course, transmitted to disc 16 by the connecting shaft so that disc 16 now rotates in the same direction as pulley-wheel 15; the rate at which disc 16 is rotated should preferably be relatively slow, for example in the neighborhood of 150 revolutions per minute.

Tank 21 is filled with the abrasive mixture, preferably kerosene carrying abrasive particles, to a sufficient level to insure that a substantial portion of disc 16 is submerged in the liquid at all times. As the disc rotates, portions of the abrasive cling to the edge of the disc and are carried around to the sawing point where they are effective in furthering the cutting effect of the thin hard edge of disc 16. The use of kerosene rather than liquids used heretofore, particularly water, has proven advantageous as evaporation is avoided; evaporation is objectionable as the resulting cooling of the Rochelle salt causes excessive breakage of the fragile material. Further, the Rochelle salt is not dissolved or otherwise affected deleteriously by the kerosene.

It has previously been observed by applicant that when saws of this general nature have been used for cutting Rochelle salt crystals, a salty accumulation tends to become glazed on the cutting edge of the disc and that the rate of cutting is reduced thereby to an unsatisfactory degree. In the instance of the saw of the present invention, however, engagement of the edge of disc 16 with the hard steel roller 43 is effective to break away this brittle glazed coating before it can build up sufficiently to be at all objectionable. While engagement of the roller with the edge of the disc tends to break away the brittle coating of salt accumulation, it tends, on the contrary, to force the abrasive particles carried by the disc into somewhat more intimate contact with the disc material than would be achieved in the absence of the roller.

As illustrated, roller 43 is provided with two circumferential grooves 51 and 52, the edge of disc 16 being shown positioned in groove 51. Engagement of the edge of the disc with the defining walls of groove 51 is effective to prevent any lateral displacement, or "wobbling," of disc 16.

While the material of roller 43 is itself cut by disc 16, this cutting takes place very slowly due to the hardness of roller 43, the fact that the roller is rotatably mounted, and the fact that the dash-pot mounting permits the roller to momentarily "back away" from the disc in the event of any undue obstruction. If groove 51 becomes deepened to an undesirable extent, the roller assembly may be rotated as described above to a position where the edge of disc 16 will be engaged by groove 52. Upon occasion the roller may be replaced by a new one.

While a specific embodiment of the invention has been selected for detailed description, the invention is not, of course, so limited in its application. The embodiment described should be taken as illustrative of the invention and not as restrictive thereof.

What is claimed is:

1. In a tool for cutting relatively thin slabs from a Rochelle salt crystal, a relatively thin rotatable disc, means for supporting the Rochelle salt crystal in position to be cut by said disc, a roller of a material harder than Rochelle salt, and means for rotatably supporting said roller in contact with the cutting edge of said disc during the cutting process, the material of said roller being softer than said cutting edge whereby a relatively thin slot is cut in said roller by said disc.

2. In a tool for cutting relatively thin slabs from a body of brittle, water soluble material, a relatively thin rotatable disc, means for supporting said body in position to be cut by said disc, a roller of a material harder than that of said body, said roller having a relatively narrow circumferential groove therein, and means for so rotatably supporting said roller with respect to said disc during the entire cutting process that the cutting edge of said disc is positioned in said groove and in contact with the bottom wall thereof, engagement of said disc and the side walls of said groove being effective to prevent lateral displacement of said disc, the material of said roller being softer than said cutting edge whereby said groove is gradually deepened by said disc.

WALTER L. BOND.